US011681420B2

(12) United States Patent
Pan et al.

(10) Patent No.: US 11,681,420 B2
(45) Date of Patent: Jun. 20, 2023

(54) PANEL-SNAPPING INTERFACE FOR RESPONSIVE DISPLAY OF MAPS

(71) Applicant: Lyft, Inc., San Francisco, CA (US)

(72) Inventors: Anna Pan, San Francisco, CA (US); Bradley Ellis, San Francisco, CA (US); Jaden Junghyuan Choi, Temecula, CA (US); Kevin Michael Tezlaf, Oakland, CA (US); Mario Gomez-Hall, San Francisco, CA (US); Robert Joseph Marsan, San Francisco, CA (US); Sravanthi Kadali, San Francisco, CA (US); Christine Mara Todorovich, San Francisco, CA (US); Marc Haumann, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/714,316

(22) Filed: Dec. 13, 2019

(65) Prior Publication Data

US 2021/0181929 A1    Jun. 17, 2021

(51) Int. Cl.
*G06F 3/04845* (2022.01)
*G06T 11/60* (2006.01)

(52) U.S. Cl.
CPC .......... *G06F 3/04845* (2013.01); *G06T 11/60* (2013.01)

(58) Field of Classification Search
CPC ................................. G06F 15/16; G06F 3/017
See application file for complete search history.

(56) References Cited

U.S. PATENT DOCUMENTS

| 2011/0060480 | A1* | 3/2011 | Mottla | G07C 9/00571 |
| | | | | 701/2 |
| 2012/0131519 | A1* | 5/2012 | Jitkoff | G06F 3/0481 |
| | | | | 715/863 |
| 2013/0132140 | A1* | 5/2013 | Amin | G06Q 30/0284 |
| | | | | 705/7.13 |
| 2013/0326380 | A1* | 12/2013 | Lai | G06F 3/0481 |
| | | | | 715/765 |
| 2017/0038948 | A1* | 2/2017 | Cun | G06F 3/017 |
| 2017/0270792 | A1* | 9/2017 | Breton | G01S 19/14 |
| 2017/0293950 | A1* | 10/2017 | Rathod | G06Q 30/0283 |
| 2021/0024100 | A1* | 1/2021 | Calleija | G08G 1/202 |

OTHER PUBLICATIONS

Transit App.; https://transitapp.com/; retrieved Jan. 8, 2020(5 pages).

(Continued)

*Primary Examiner* — Rayeez R Chowdhury
(74) *Attorney, Agent, or Firm* — Keller Preece PLLC

(57) ABSTRACT

Methods and systems for presenting transportation options that utilize different modalities are provided. In one embodiment, a method is provided that includes receiving a location of a mobile device. A map may then be generated on the mobile device that depicts an area surrounding the location of the mobile device. An information value of the map may be determined and a first position of a panel may be determined based on the information value. The map and the panel may be displayed, with the panel overlaying at least a portion of the map in the first position.

20 Claims, 9 Drawing Sheets

(56) References Cited

OTHER PUBLICATIONS

Nickelsburg, Monica; Google Maps adds Lime scooters and bikes as transportation options in more than 100 cities; GeekWire; Aug. 13, 2019; https://www.geekwire.com/2019/google-maps-adds-lime-scooters-transportation-option-100-cities/; retrieved Jan. 8, 2020 (9 pages).
How to use Citymapper—the app that gives you directions and transport options for cities; BT; Mar. 4, 2018; https://home.bt.com/tech-gadgets/internet/how-to-use-citymapper-offline-which-cities-in-11364254337671; retrieved Jan. 8, 2020 (8 pages).
Constine, Josh; Embracing multimodality, Uber pioneers ride recommendations; TechCrunch; Oct. 18, 2018; https://techcrunch.com/2018/10/18/uber-recommendations/; retrieved Jan. 8, 2020 (13 pages).
Constine, Josh; 25+ launches from Uber's big event; TechCrunch; Sep. 26, 2019; https://techcrunch.com/2019/09/26/uber-uber-eats/; retrieved Jan. 8, 2020 (19 pages).
CNN Wire; Uber will now show you where to rent bikes and scooters; WGNO; Jul. 1, 2019; https://wgno.com/2019/07/01/uber-will-now-show-you-where-to-rent-bikes-and-scooters/; retrieved Jan. 8, 2020 (4 pages).
Dickey, Megan Rose; Uber brings bikes and scooters, including Lime's, to the forefront; Jul. 1, 2019; TechCrunch; https://techcrunch.com/2019/07/01/uber-brings-bikes-and-scooters-including-limes-to-the-forefront/; retrieved Jan. 8, 2020 (8 pages).
CNN Wire; Self-driving scooters are coming to city sidewalks; ABC7 Chicago; https://abc7chicago.com/technology/self-driving-scooters-are-coming-to-city-sidewalks/5620414/; retrieved Jan. 8, 2020 (7 pages).

\* cited by examiner

PANEL-SNAPPING INTERFACE FOR RESPONSIVE DISPLAY OF MAPS

BACKGROUND

Individuals desiring transportation (e.g., transportation by vehicle) between locations can submit transportation requests to transportation providers. In particular, users may submit transportation requests identifying specific locations between which transportation is desired and/or specific types of vehicles for use in provided transportation. In response, transportation management systems may identify multiple vehicles that capable of fulfilling the transportation requests.

SUMMARY

The present disclosure presents new and innovative systems and methods for presenting transportation options that utilize different modalities. In a first aspect, a system is provided that includes a processor and a memory. The memory may store instructions which, when executed by the processor, cause the processor to receive a location of a mobile device and generate a map of an area surrounding the location of the mobile device, the map displaying indicators of multiple types of vehicles. The memory may store further instructions which, when executed by the processor, cause the processor to determine an information value of the map and determine, based on the information value of the map, a first position of a panel. The memory may store still further instructions which, when executed by the processor, cause the processor to display, on the mobile device, (i) the map, and (ii) the panel in the first position overlaying at least a first portion of the map in the first position.

In a second aspect according to the first aspect, the first position is determined from among a standard position overlaying less than half of the map, a collapsed position overlaying a smaller portion of the map than the standard position, and an expanded position overlaying a majority of the map.

In a third aspect according to the second aspect, determining the first position further comprises at least one of (i) determining that the information value is less than a first predetermined threshold and identifying the expanded position as the first position, (ii) determining that the information value is greater than the first predetermined threshold and less than a second predetermined threshold and identifying the standard position as the first position, and (iii) determining that the information value is greater than the second predetermined threshold and identifying the collapsed position as the first position.

In a fourth aspect according to any of the first through third aspects, the information value is determined based on at least one of (i) vehicles currently located near the location of the mobile device, (ii) a previous type of vehicle used by a user associated with the mobile device, and (iii) a predicted destination of the user associated with the mobile device.

In a fifth aspect according to any of the first through fourth aspects, the memory stores further instructions which, when executed by the processor, cause the processor to detect a user interaction moving the panel with a velocity, identify a second position based on the first position and the velocity, and move the panel to the second position overlaying a second portion of the map.

In a sixth aspect according to any of the first through fifth aspects, the map displays a first vehicle of a first type and a second vehicle of a second type located in the area surrounding the location of the mobile device. The memory may store further instructions which, when executed by the processor, cause the processor to detect a user interaction selecting the first vehicle, identify a second position associated with the first type of the first vehicle, and move the panel to the second position overlaying a second portion of the map.

In a seventh aspect according to any of the first through sixth aspects, the memory stores further instructions which, when executed by the processor, cause the processor to display tab identifiers beneath the map, detect a second user interaction selecting a tab identifier of the tab identifiers, and move the panel to a third position that is selected based on the tab identifier.

In an eighth aspect, a method is provided that includes receiving a location of a mobile device and generating a map of an area surrounding the location of the mobile device, the map displaying indicators of multiple types of vehicles. The method may also include determining an information value of the map and determining, based on the information value of the map, a first position of a panel. The method may further include displaying, on the mobile device, (i) the map, and (ii) the panel in the first position overlaying at least a first portion of the map in the first position.

In a ninth aspect according to the eighth aspect, the first position is determined from among a standard position overlaying less than half of the map, a collapsed position overlaying a smaller portion of the map than the standard position, and an expanded position overlaying a majority of the map.

In a tenth aspect according to the ninth aspect, determining the first position further comprises at least one of (i) determining that the information value is less than a first predetermined threshold and identifying the expanded position as the first position, (ii) determining that the information value is greater than the first predetermined threshold and less than a second predetermined threshold and identifying the standard position as the first position, and (iii) determining that the information value is greater than the second predetermined threshold and identifying the collapsed position as the first position.

In an eleventh aspect according to any of the eighth through tenth aspects, the information value is determined based on at least one of (i) vehicles currently located near the location of the mobile device, (ii) a previous type of vehicle used by a user associated with the mobile device, and (iii) a predicted destination of the user associated with the mobile device.

In a twelfth aspect according to any of the any of the eighth through eleventh aspects, the memory stores further instructions which, when executed by the processor, cause the processor to detecting a user interaction moving the panel with a velocity, identifying a second position based on the first position and the velocity, and moving the panel to the second position overlaying a second portion of the map.

In a thirteenth aspect according to any of the eighth through twelfth aspects, the map displays a first vehicle of a first type and a second vehicle of a second type located in the area surrounding the location of the mobile device. The method may further include detecting a user interaction selecting the first vehicle, identifying a second position associated with the first type of the first vehicle, and moving the panel to the second position overlaying a second portion of the map.

In a fourteenth aspect according to any of the eighth through thirteenth aspects, the method further includes displaying tab identifiers beneath the map, detecting a second user interaction selecting a tab identifier of the tab identifiers, and moving the panel to a third position that is selected based on the tab identifier.

In a fifteenth aspect, a non-transitory, computer-readable medium storing instructions which, when executed by a processor, cause the processor to receive a location of a mobile device and generate a map of an area surrounding the location of the mobile device, the map displaying indicators of multiple types of vehicles. The non-transitory, computer-readable medium may also store instructions which, when executed by a processor, cause the processor to determine an information value of the map and determine, based on the information value of the map, a first position of a panel. The non-transitory, computer-readable medium may store further instructions which, when executed by a processor, cause the processor to display, on the mobile device, (i) the map, and (ii) the panel in the first position overlaying at least a first portion of the map in the first position.

In a sixteenth aspect according to the fifteenth aspect, the first position is determined from among a standard position overlaying less than half of the map, a collapsed position overlaying a smaller portion of the map than the standard position, and an expanded position overlaying a majority of the map.

In a seventeenth aspect according to the sixteenth aspect, determining the first position further comprises at least one of (i) determining that the information value is less than a first predetermined threshold and identifying the expanded position as the first position, (ii) determining that the information value is greater than the first predetermined threshold and less than a second predetermined threshold and identifying the standard position as the first position, and (iii) determining that the information value is greater than the second predetermined threshold and identifying the collapsed position as the first position.

In an eighteenth aspect according to any of the fifteenth through seventeenth aspects, the information value is determined based on at least one of (i) vehicles currently located near the location of the mobile device, (ii) a previous type of vehicle used by a user associated with the mobile device, and (iii) a predicted destination of the user associated with the mobile device.

In a nineteenth aspect according to any of the fifteenth through eighteenth aspects, the non-transitory, computer-readable medium stores further instructions which, when executed by the processor, cause the processor to detect a user interaction moving the panel with a velocity, identify a second position based on the first position and the velocity, and move the panel to the second position overlaying a second portion of the map.

In a twentieth aspect according to any of the fifteenth through nineteenth aspects, the map displays a first vehicle of a first type and a second vehicle of a second type located in the area surrounding the location of the mobile device. The non-transitory, computer-readable medium may store further instructions which, when executed by the processor, cause the processor to detect a user interaction selecting the first vehicle, identify a second position associated with the first type of the first vehicle, and move the panel to the second position overlaying a second portion of the map.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
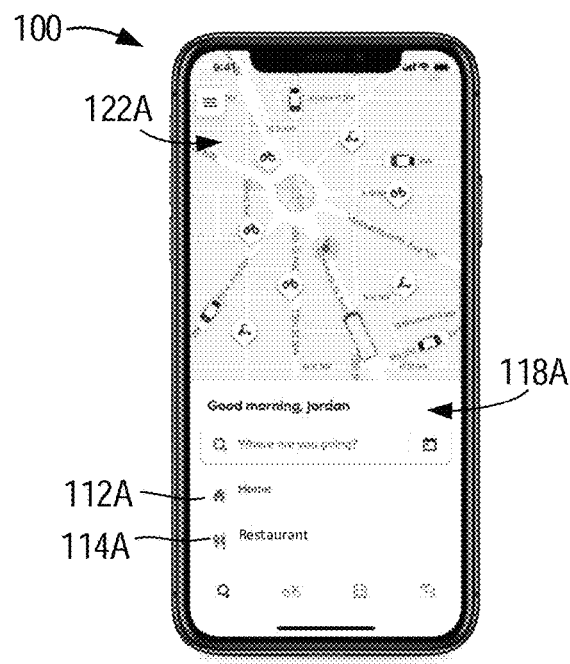
FIGS. 1A-1D illustrate user interfaces according to exemplary embodiments of the present disclosure.
Figure 1B:
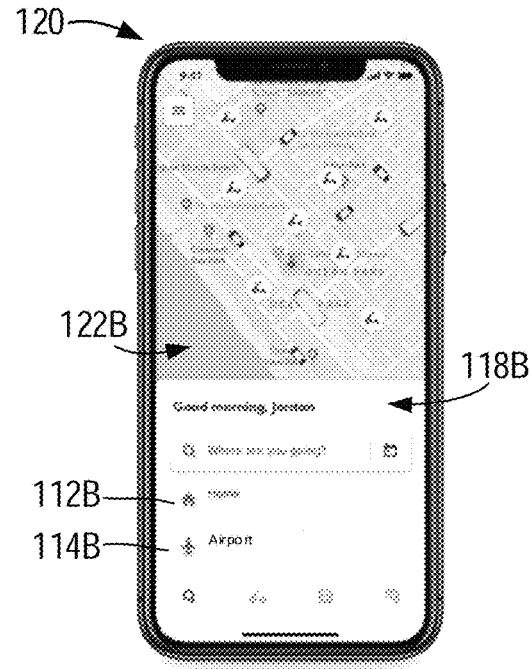
Figure 1C:
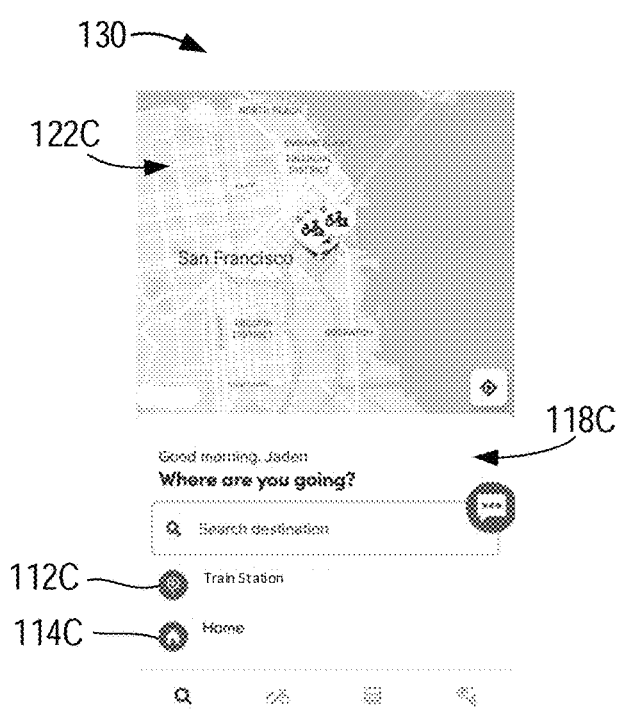
Figure 1D:

Aspects of the present disclosure involve systems and methods for displaying a map and an overlaying panel and updating the display based on user interactions. In various aspects, the disclosed system may receive a current location of user device and display a map of an area surrounding the current location of the user device along with vehicles located in the area. A panel is also displayed in a position overlaying a portion of the map based on user interactions with the displayed map.

For example, when a user accesses a transportation system, such as a transportation matching system, a user may see a user interface. The user interface may include map generated based on the user's current location and a panel presenting information relevant to receiving transportation. For example, the map may present a visual representation of an area surrounding the user and may include visual indicators that correspond to the locations of particular vehicles (e.g., vehicles available for use by the user) and the panel may present information about nearby vehicles and/or information about potential destinations for the user. For example, FIGS. 1A-1D depict user interfaces 100, 120, 130, 140. The user interfaces 100, 120, 130, 140 include maps 122A-D and panels 118A-D overlaying the maps 122A-D. The panels 118A-D include information items 112A-D, 114A-D, 146, which display information regarding potential destinations, such as home, a train station, a restaurant, and an airport, as well as destinations that are trending near a user (e.g., the information item 146).

As can be seen in the user interfaces 100, 120, 130, 140 all include panels 118A-D in relatively similar positions. In particular, the panels 118A-D overlay approximately half of the maps 122A-D. However, in certain implementations, panels 118A-D in these positions may not be optimal. For example, in certain instances, such as when there are many nearby vehicles (e.g., in the maps 122A-B), it may be advantageous to display more of the maps 122A-D. As another example, in other instances, such as where there are few nearby vehicles (e.g., in the map 122D) and/or where a user intends to utilize particular types of vehicles (e.g., buses or trains), it may be advantageous for the panels 118A-D to be larger so that additional information items can be displayed. For example, users desiring transportation by bus or train may need to see arrival times at particular stops or transit locations. Further, users may need to be able to enter their desired destination to receive recommendations for routes and estimated transportation times. However, user interfaces such as the user interfaces 100, 120, 130, 140 that maintain panels in particular positions may not responsively adapt the positions of the panel to display optimal amounts of information. Additionally, such user interfaces 100, 120, 130, 140 typically do not account for user preferences and/or past practices in vehicle selections and may accordingly be unable to preemptively display a preferred or most relevant view to a user. Such user interfaces may therefore display too much information, which can be unnecessary, confusing, and difficult for users to parse. Additionally, in other scenarios, the user interfaces may not display enough information, which may require further user interactions, reducing the speed with which users can request transportation and frustrating users.

Therefore, there exists a need to responsively present information to a user viewing an interface which includes both an information panel and a map to select vehicles and/or receive transportation. One solution to this problem is to display information in a panel than can be repositioned to cover differing proportions of the map. For example, the panel may cover less than half of the map, more than half of the map, or may be collapsed to cover a minimal portion of the map. The panel may be initially positioned based on an information measure of the map that the panel is overlaying, such as a type of vehicle to predicted to be used by a user, and/or based on the types of vehicles that are located near the user. Further, if a user selects a particular type of vehicle from the map, the panel may automatically reposition (e.g., to display more information or less information) depending on the type of vehicle selected. Additionally, if a user interaction moves the panel (e.g., moves the panel with a particular velocity), the panel may responsively snap to particular positions (e.g., based on the velocity). In this way, the limited display space available on user devices may be efficiently allocated to include relevant amounts of information for a user without unnecessarily obscuring the map. Further, by responsively adapting to user interactions, the panel may ensure that the efficient allocation is maintained even as the user selects different types of vehicles.

Figure 2:
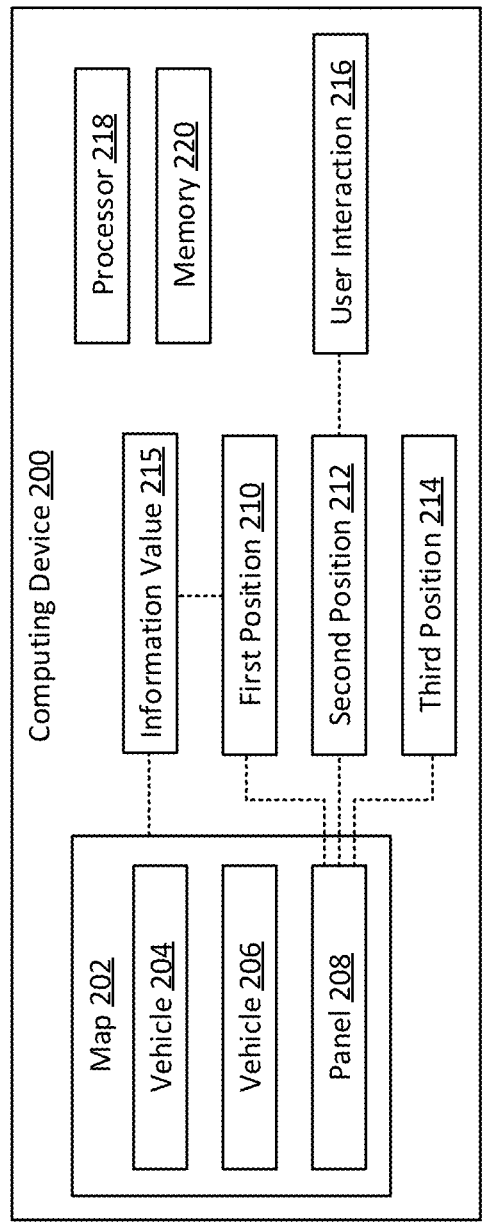
FIG. 2 illustrates a system according to an exemplary embodiment of the present disclosure.

FIG. 2 depicts an example computing device 200 for positioning panels on a display according to an exemplary embodiment of the present disclosure. The computing device 200 may be configured to generate a map 202 with representations of vehicles 204, 206. The computing device 200 may also generate a panel 208, which may be displayed in at least one of a first position 210, a second position 212, and a third position. For example, the panel 208 may initially be displayed in the first position 210 and may later be displayed in the second position 212 and/or third position 214. The various positions 210, 212, 214 may be a standard position overlaying less than half of map 202, a collapsed position overlaying a smaller portion of map 202 than the standard position, an expanded position overlaying a majority of map 202, and a minimized position where the panel is hidden and does not overlay the map 202.

For example, panel 208 may initially overlay a portion of map 202 in the first position 210. The initial position 210 of panel 208 may be the standard position overlaying less than half of map 202. The initial position or first position 210 of panel 208 may be based on the vertical resolution of the display, for example on user devices (e.g., computing device 200) with sufficient vertical resolution on their corresponding displays, first position 210 may be the standard position or the expanded position as the vertical resolution is sufficient to accommodate larger panel overlays. Conversely, if the user device (e.g., computing device 200) has insufficient vertical resolution (e.g., a vertical resolution below a predetermined threshold), a collapsed position may be determined as the first position 210. In certain implementations, the predetermined threshold may be set at, e.g., 750-1,250 pixels. In still further implementations, the above determinations may be based on a comparison of the screen size of the user device to a predetermined threshold (e.g., 3.5-5.5 inches). For example, the predetermined threshold may be for screens that are 5 inches or smaller. If the user device has a screen that is smaller than 5 inches, the first position may be determined as a collapsed position and if the screen is larger than 5 inches, the first position may be determined as a standard position.

Furthermore, the initial position or first position 210 of panel 208 may be based on vehicles 204, 206 currently located near the location of the user device (e.g., computing device 200). Vehicles 204, 206 may be of different kinds associated with different transportation modalities, such as road-going vehicles (e.g., cars), personal mobility vehicles (e.g., bikes and scooters), or public transit vehicles (e.g., trains). For example, if vehicles 204, 206 are both cars, both personal mobility vehicles (e.g., bikes and scooters), or a mixture of cars and personal mobility vehicles, then the first position may be a standard position. Conversely, if vehicles 204, 206 include public transit vehicles, such as trains, then a collapsed position may be the default first position 210.

In other examples, first position 210 may be based a previous type of vehicle used by a user associated with the user device (e.g., computing device 200). For example, certain types of vehicles may be associated with a default first position 210 where a previous type of vehicle used by a requestor associated with a mobile device. The default first position 210 associated with a particular type of vehicle may be identified as the position utilized by a user previously when receiving transportation via the particular type of vehicle (e.g., last utilized in connection with a previous transportation request and/or most frequently utilized in connection with multiple previous transportation requests). In certain implementations, therefore, the computing device 200 may identify the corresponding default first position 210 as the default first position 210 associated with the vehicle last utilized by the user. For example, if the user's previous trip involved a train, then the user device (e.g., computing device 200) may automatically display map 202 with panel 208 in the default first position 210 associated with public transit vehicles (e.g., trains). In still further implementations, the computing device 200 may predict the type of vehicle a user will utilize and may display the panel 208 in the default first position 210 associated with the predicted type of vehicle. For example, a user may be requesting at or around 5 PM and the user may typically utilize scooters at 5 PM. Accordingly, the computing device 200 may display the panel 208 in the default first position 210 associated with scooters. First position 210 may also be based on a predicted destination of the user associated with the user device (e.g., computing device 200). In still further implementations, the first position 210 may be determined based on market conditions (e.g., to leave room to display available vehicles or to present information relevant to available vehicles). Additionally or alternatively, the first position 210 may be determined based on current weather conditions, for example, to prioritize display of vehicles of particular types (e.g., automobiles, buses, trains) and to reduce display of vehicles of other types (e.g., bicycles, scooters) in times of inclement weather (e.g., rainy weather, windy weather, hot weather).

As discussed above, computing device 200 may generate a map 202 with representations of vehicles 204, 206 that occupy an area surrounding the current location of computer device 200. Additionally, computing device 200 may be configured to detect a user interaction(s) 216 and panel 208 may be moved from the first position 210 to second or third positions 212, 214 based on the user interaction(s) 216. User interactions 216 may include dragging the panel 208, selecting a menu option, selecting a tab identifier, selecting a vehicle 204, 206 displayed on map 202, submitting a voice request (e.g., using a digital assistant), and submitting a request based on gaze tracking (e.g., by lingering gaze over any of the above-discussed elements of the map 202 and/or panel 208). Vehicles 204, 206 may be of different kinds associated with different transportation modalities, such as road-going vehicles (e.g., cars), personal mobility vehicles (e.g., bikes and scooters), or public transit vehicles (e.g., trains and buses).

The computing device 202 may additionally calculate an information value 215 that estimates an amount of information depicted in the map 202 (e.g., an amount of information relevant to a requesting user). For example, the information value 215 may be calculated based on the number and/or type of vehicles 204, 206 depicted by the map 202. As a specific example, the information value 215 may be higher if the map 202 depicts a larger number of vehicles and may be lower if the map 202 depicts a smaller number of vehicles. As another specific example, the information value 215 may be higher if the map 202 depicts vehicles that a user frequently uses (e.g., based on previously-received transportation requests from the user) and may be lower if the map 202 depicts vehicles that the user infrequently uses. As a still further example, certain types of vehicles (e.g., trains and/or buses) may result in lower information values 215 (e.g., may add less to the information value 215) and other types of vehicles (e.g., automobiles, scooters, and/or bicycles) may result in higher information values 215 (e.g., may add more to the information value 215). Similarly, the information value 215 may be calculated at least in part based on qualities of vehicles depicted on the map. The qualities of vehicles depicted on the map may depict a status of whether particular vehicles are capable of fulfilling a transportation request for the user. For example, if the map 210 depicts indicators of electrically-powered vehicles (e.g., electrically-powered bikes and/or scooters), the information value 215 may be higher if the map 210 depicts vehicles with a high battery charge level (e.g., greater than 50% battery charge) and the information value 215 may be lower if the map 210 depicts vehicles with a lower battery charge level. In still further implementations, the information value 215 may be calculated based on clusters of vehicles included on the map 202. For example, clusters of multiple vehicles may be identified by an individual cluster identifier on the map 202, and the clusters may include associated weighted values that indicate a relative priority of the vehicles in the cluster to the user. The information measure 215 may be calculated to be larger for larger weighted values of clusters displayed on the map 202 and to be smaller for smaller weighted values of clusters displayed on the map. Clusters of vehicles and their associated weighted values are discussed in further detail in U.S. application Ser. No. 16/714,297, entitled "DISPLAY OF MULTI-MODAL VEHICLE INDICATORS ON A MAP" and filed on Dec. 13, 2019, which is herein incorporated by reference.

In certain implementations, the information value 215 may be calculated based on multiple criteria (e.g., multiple of the above-discussed criteria). In such implementations, values may be calculated for each criteria and may be combined (e.g., added) to generate the information value 215. In still further implementations, the information value 215 may be calculated by a machine learning model trained to receive and process the multiple criteria.

The first position 210 may then be determined based on the information value 215. For example, if the information value 215 is low (e.g., below a first predetermined threshold), the panel 208 may be displayed larger (e.g., in an expanded position) to display more information items. As another example, for medium information values 215 (e.g., values above or equal to the first predetermined threshold and below a second threshold), the panel 208 may be displayed in a medium size (e.g., in a standard position) to balance between displaying information items and displaying the map. As a further example, for high information values 215 (e.g., above or equal to the second predetermined threshold), the panel 208 may be displayed in a smaller size (e.g., in a collapsed or minimized position) to leave more display space for the map 202.

Based on user interaction 216 (e.g., based on the type of vehicle selected), computing device 200 may determine an updated position or second position 212 for panel 208 and move panel 208 from first position 210 to the second position 212. Other user interactions 216, such as selecting a menu option or selecting a tab identifier, the computing device 200 may determine another updated position or third position 214 for panel 208 and move the panel from the second position 212 to third position 214.

Figure 3:
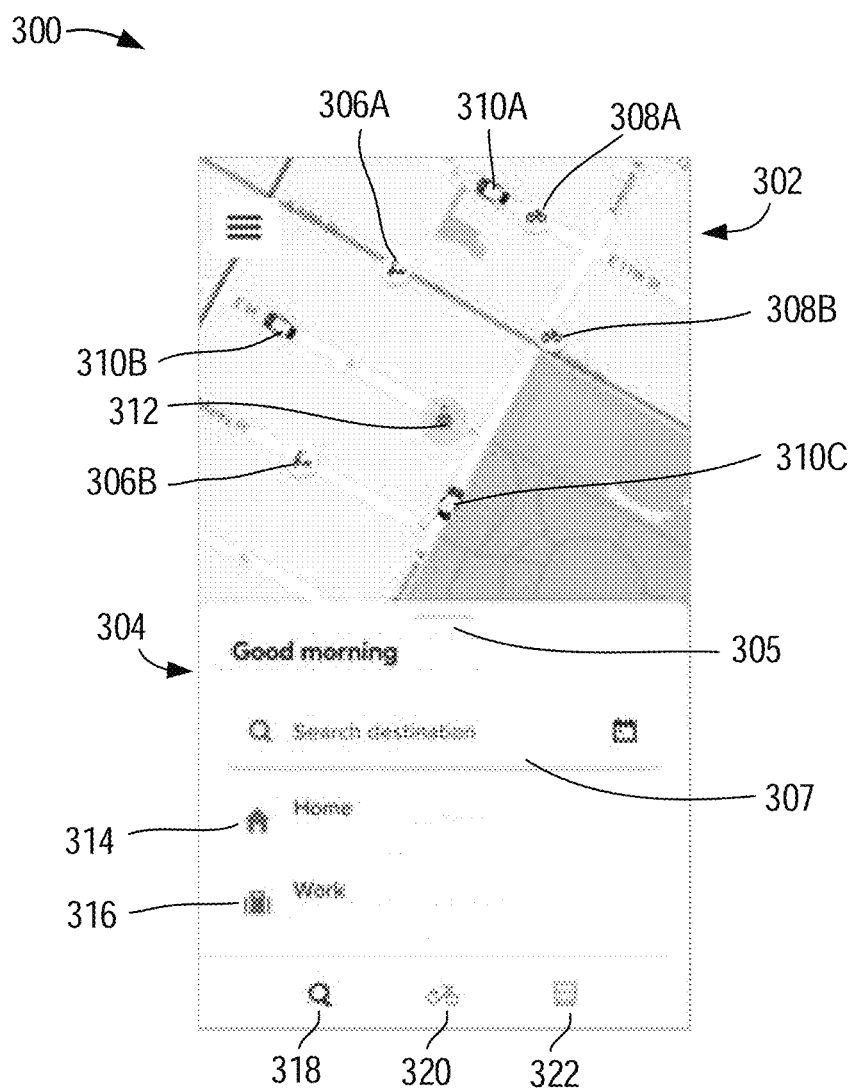
FIG. 3 illustrates a user interface of a user device according to an exemplary embodiment of the present disclosure.

FIG. 3 depicts an example user interface 300 of a user device (e.g., computing device 200) according to an exemplary embodiment of the present disclosure. The user interface 300 may be implemented by a mobile device to display a map 302 of an area surrounding the location (e.g., current location 312) of the user device. Map 302 is generated to display an indicator of the current location 312 of the user device along with vehicles (e.g., scooters 306A-B, bikes 308A-B and cars 310A-C) located in the area surrounding the location 312 of the mobile device. User interface 300 also includes a panel 304 that overlays at least a portion of map 304. Panel 304 may include a headline such as "Good morning", a search box, a calendar access button, and information items 314, 316 such as a predicted destinations (e.g., "Home" and "Work"), and tab identifiers 318, 320, 322. The panel 304 also includes an interaction indicator 305, which may indicate that a user can manipulate the position of the panel 304. As depicted, the interaction indicator 305 may be a line at the top of the panel 304, although other implementations are possible (e.g., differently-colored portions of the panel 304, buttons on the panel 304).

As illustrated in FIG. 3, panel 304 is positioned in a standard position. The original position or first position of panel 304 may be based on the vertical resolution of the display for user interface 300. For example, if the display for user interface 300 exceeds a predetermined threshold, then the default position for panel 304 may be the standard position or the expanded position because the display has adequate resolution to support a larger panel 304. The default position for panel 304 may also be based on the types of vehicles (e.g., scooters 306A-B, bikes 308A-B and cars 310A-C) located near the current location 312 of the user device. For example, in the illustrated example, multiple vehicle modalities are presented, such as road-going vehicles (e.g., cars 310A-C) and personal mobility vehicles (e.g., bikes 308A-B and scooters 306A-B), which may result in panel 304 overlaying map 302 in a standard position occupying approximately half of the user interface 300. In alternative embodiments, if only public transit vehicles (e.g., trains) were located near the current location 312 of the user device, panel 304 may be expanded to show a list of train schedules as information items within panel 304. Furthermore, if there are no vehicles in the area near the user device, then the panel 304 may be collapsed (e.g., moved to a lower position such as the collapsed position) to allow a larger view of map 302 until a vehicle is included within the visible portion of the map.

The original position of panel 304 may also be based on a type of vehicle previously utilized by a user. For example, locations of scooters 306A-B displayed on a map relative to the current location 312 of a user may be more important to the user so the user can locate and navigate to an available scooter. Panel 304 may therefore default to a collapsed position to provide a larger view of map 302 if a recent, previously-completed transportation request associated with the user indicates that the user had previously used a scooter 306A-B, or based on the user's preference for personal mobility vehicles. In another example, the original position of panel 304 may be based on a predicted destination of the user. For example, if previously-completed transportation request indicate that the user typically travels directly home from work via a road-going vehicle (e.g., car 310A-C), then panel 304 may be positioned in a standard or expanded position, dynamically providing space within the panel 304 to display multiple information items 314, 316, such as past or predicted destinations (e.g., "Home" and "Work" destinations) and/or information items 314, 316 identifying potential transportation options by car including transportation proposals that include estimated cost and arrival times. By predicting the destination and/or the modality of travel, user interface 300 may display panel 304 such that the panel can dynamically display relevant portions of the map 202 and information items 314, 316 (e.g., transportation proposals and predicted destinations).

The tab identifiers 318, 320, 322 may be selected by the user, which may cause the user interface 300 to display panel 304 in a different position. In the example illustrated in FIG. 3, the search tab identifier 318 is selected, which includes a search bar 307 in panel 304 to "search destination". Because selecting the search tab identifier 318 enables the user to enter search terms, detecting a user interaction of selecting the search tab identifier 318 may adjust panel 304 to either a standard position or an expanded position to allow sufficient space for the search bar 307 in panel 304. Other tab identifiers 320, 322 include transportation modality indicators and allow the user to switch between different map views to show a particular type of vehicle. For example, by selecting tab identifier 320 (e.g., the "bicycle icon"), user interface 300 may display map 302 that only shows personal mobility vehicles (e.g., scooters 306A-B and bikes 308A-B) in the area surrounding the location (e.g., current location 312) of the user device. Similarly, by selecting tab identifier 322 (e.g., the "train icon"), user interface 300 may display map 302 that only shows public transit vehicles (e.g., trains) in the surrounding the location (e.g., current location 312) of the user device.

Furthermore, selection of tab identifiers 318, 320, 322 may change the information items 314, 316 displayed in panel 304. In the illustrated example, with the search tab identifier 318 selected, panel 304 displays a search bar 307 and information items 314, 316 that include predicted destinations (e.g., "Home" and "Work"). If tab identifier 320 (e.g., the "bicycle icon") is selected, panel 304 may display information items such as transportation proposals that include personal mobility vehicles (e.g., scooters 306A-B and bikes 308A-B) and the costs associated with each. Similarly, if tab identifier 322 (e.g., the "train icon") is selected, panel 304 may display information items such as transportation proposals that include public transit vehicles (e.g., trains) and may display a list of possible train lines and departure times.

The location of panel 304 may change based on user interactions with user interface 300, such as selection(s) of tab identifiers 318, 320, 322. For example, as mentioned above, FIG. 3 illustrates user interface 300 when tab identifier 318 is selected. In this view, panel 304 is in a standard position that overlays less than half of map 302. However, if transportation modality tab identifier 322 is selected, panel 304 may move to an expanded position overlaying the majority of map 302, thereby allowing additional information items to be displayed on user interface 300 within panel 304, such as upcoming train schedule departure times.

Map 302 may be updated in real-time (e.g., in response to real-time feedback from the transportation matching system 102, provider devices 114, 116, 118, and user device 104). Specifically, the location 312 of user device 104 may be updated in real-time and map 302 may be updated based on location 312 to provide an updated area surrounding the current location of the user device 104. Additionally, map 302 may display vehicles (e.g., scooters 306A-B, bikes 308A-B and cars 310A-C) that are located within the updated area surrounding the current location 312 of user device 104. Real-time generation and display of map 302 ensures users can make accurate transportation decisions by selecting vehicles in their current vicinity. Without real-time map updates, users may vehicle selections that are outdated (e.g., no longer in the area surrounding the current location of user device 104) and therefore do not reflect the actual vehicles a user may engage or interact with. As the map 302 is updated, an information value associated with the map may be recalculated (e.g., to account for changes to the number of vehicles, type of vehicles, or other criteria used to calculate the information value). The position of the panel 304 may, in certain implementations, be updated in response to the updated information value (e.g., according to changes in how the updated information value compares to the above-discussed first and/or second predetermined thresholds).

Figure 4A:
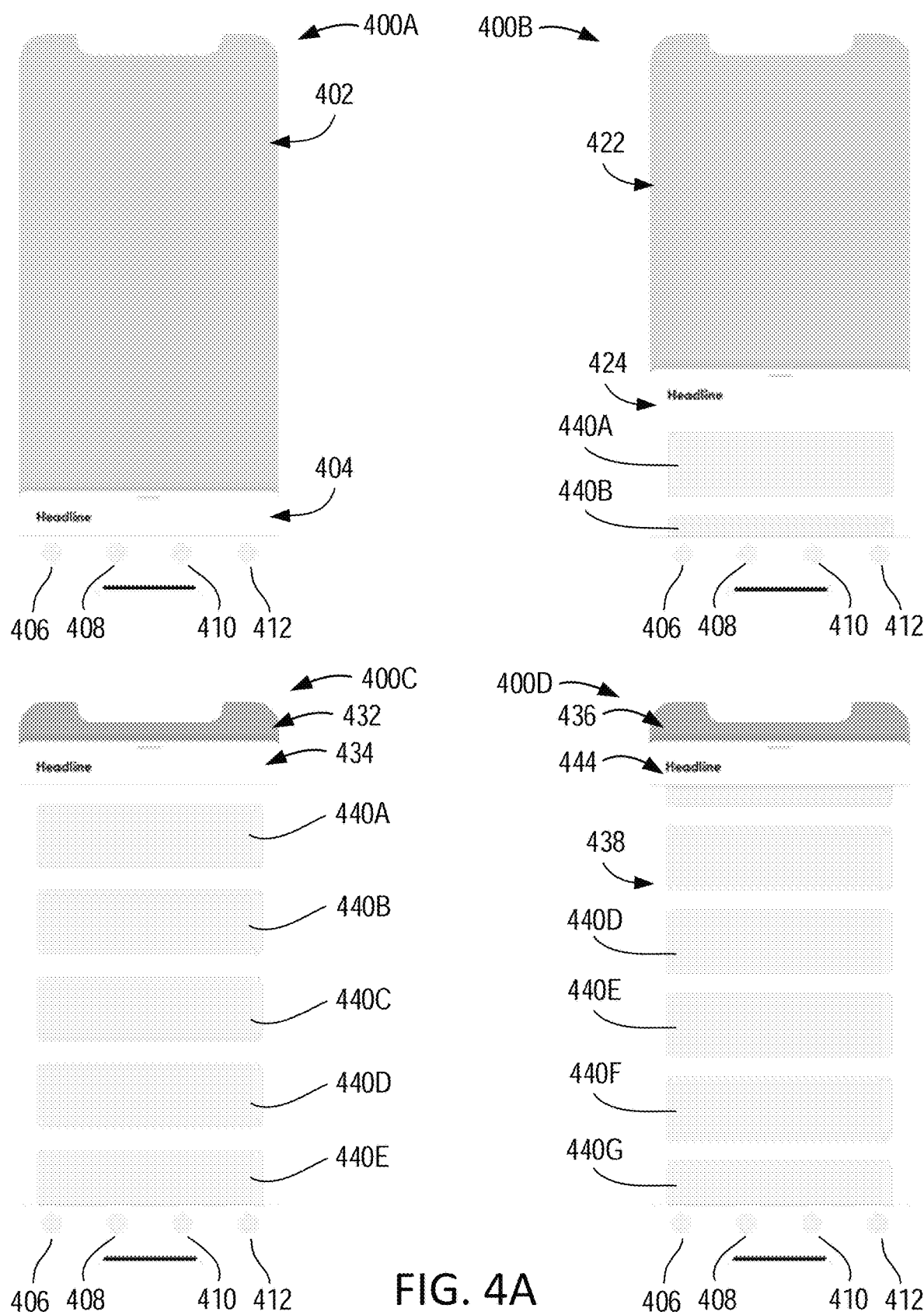
FIG. 4A illustrates various user interface configurations, according to exemplary embodiments of the present disclosure.

FIG. 4A illustrates user interfaces 400A-D according to exemplary embodiments of the present disclosure. The user interfaces 400A-D may be implemented by a mobile device and/or a user device (e.g., user device 104, 106), such as computing device 200. For example, the user interfaces 400A-D may be used to at least partially implement block 504 of the method 500, which is described in more detail below. User interfaces 400A-B include a map portion or maps 402, 422, which depict information similar to that of map 302 of FIG. 3. For example, the maps 402, 422 may depict a current location of a user device along with various vehicles (e.g., cars, bikes and scooters) that are currently located within an area surrounding the location of the user device.

User interfaces 400A-D also include panels 404, 424, 434 and 444. In particular, user interface 400A illustrates panel 404 in a collapsed position, which may be the smallest size of panel 404. In an example, the collapsed position may occupy at least 64 points of on the screen of a user device, such as a mobile phone. For example, a point may be equivalent to 1/163 of an inch (e.g., on the iOS® operating system). Furthermore, a safe area (e.g., a 34 point safe area) may be included near the bottom of the display in which user interface elements such as the panel 404 cannot be displayed. This may therefore result in a minimum size for the collapsed position as 98 points (e.g., 64 points+34 points). Although not depicted, in certain implementations, a panel in the collapsed state may display one or more information items. For example, a smaller information item (e.g., a portion of the information item previously identified as containing the most important or actionable information such as ETA, directions, etc.) may be displayed on the panel 404 in the collapsed state. As a specific example, an information item displaying information regarding nearby bikes and/or scooters in the standard position may instead display a selectable button to trigger a scanning interface to unlock nearby bikes and/or scooters for use.

User interface 400B illustrates panel 424 in a standard position. The standard position may be a typical default position of the panel 424 and may overlap less than 50 percent of the map 422. The height of the standard position may depend on whether the map portion or map 422 is preferable (e.g., an information value of the map) and on whether the panel 424 is expandable. The height of the standard position may additionally or alternatively depend on the information items 440A-B displayed within the panel. For example, the standard position may be sized to fully display two information items and/or to fully display one information item 440A (or two information items) and partially display another information item 440B.

Panel 404, 424, 434, 444 may be draggable or non-draggable, which may allow the user to change the panel's position by dragging the panel up or down. Dragging the panel 404, 424, 434, 444 may expand the panel 404, 424, 434, 444 to an intermediate position between that illustrated in user interface 400B and user interface 400C (e.g., an intermediate position higher than the position of the panel 42 and lower than the panel 434). Additionally, panel 424 may be expandable such that panel 424 is capable of expanding from the collapsed position in user interface 400A and/or the standard position in user interface 400B to the expanded position in user interface 400C. For example, in the standard position, a user may freely drag the panel up (e.g., towards top of user interface 400A) such that the panel 424 follows the user's finger. The user may also freely drag the panel down (e.g., towards bottom of user interface 400A), but the panel 424 may move at a slower rate giving the notion of drag resistance to the user.

Panels may also follow pre-set snapping guidelines such that the panels "snap" to (e.g., preferentially stop and/or position at) one or more predefined stop positions when a user drags the panel near the predefined stop positions. For example, the predefined stop positions may be the vertical height positions associated with the collapsed position (e.g., within 60 points of the bottom of the screen), standard position (e.g., within 60 points of the middle of the screen), and expanded position (e.g., within 60 points of the top of the screen). Additionally, for a panel with three heights (e.g., collapsed, standard, expanded), there may be four total snap locations (e.g., 60 points above collapsed, 60 points under standard, 60 points above standard, 60 points under expanded). For example, when a panel 424 is dragged from the standard position, the panel may snap to the expanded position when dragged 60 points or more above the standard position and may snap to the collapsed position when dragged 60 points or more below the standard position. As another example, when a panel 404 is dragged from the collapsed position, the panel may snap to the standard position when dragged 60 points or more above the collapsed position and may snap to the expanded position dragged above the vertical position associated with the standard position. As a still further example, when a panel 434 is dragged from the expanded position, the panel may snap to the standard position when dragged 60 points or more below the expanded position and may snap to the collapsed position when dragged below the vertical position associated with the standard position.

Snapping panels 404, 424, 434 to different positions may change the information items 440A-G displayed on the panels. For example, snapping a panel 424, 434 to the collapsed state may collapse one of the information items 440A-G to a smaller, collapsed state to display actionable or important information to a user, as described above. As another example, snapping a panel 424 from the standard state to the expanded state may cause information items 440A-G to expand to a larger, expanded state that displays more information to the user. Similarly, snapping the panel 432 from the expanded state to the standard state may transition the information items 440A-G to a standard state with a smaller height than the expanded position. In certain implementations, the information item 440A-G that is expanded to show more information on a panel in the expanded state and/or collapsed to remain visible on a panel in the collapsed state may be selected based on a likelihood that the user will select or interact with the information item. For example, the information item 440A-G that is expanded or collapsed may be the first information item displayed, the second information item displayed, and/or an information item with the highest predicted likelihood of being selected by the user (e.g., based on user preferences associated with the user, based on a ranking of information items received for display). In still further implementations, the information item 440A-G that is expanded or collapsed may be selected based on whether the information item 440A-G is presenting actionable information to the user (e.g., directions the user is following). For example, if an information item 440A-G is providing navigation directions to the user, the information item 440A-G may be selected for expanding or collapsing as the panel snaps to different positions.

In additional or alternative implementations, a user interaction may move the panels 404, 424, 434 with a particular velocity, and the velocity may be used, at least in part, to determine the position to which the panel snaps. The velocity may represent a vertical speed of movement of the panel 404, 424, 434 (e.g., the top of the panel 404, 424, 434) as a result of the user interaction. The velocity may be measured using any suitable unit, such as points traveled per second, distance traveled per second, and pixels traveled per second, and may include a direction (e.g., upward or downward). For example, when a panel 424 is dragged from the collapsed position and released below the snapping point for the standard position (e.g., 60 points above the collapsed position), the panel may snap to the standard position if the velocity of the panel is above a first predetermined threshold (e.g., 5 points per second upward) and below a second predetermined threshold (e.g., 10 points per second upward) and may snap to the expanded position if the velocity of the panel is above the second predetermined threshold. Similarly, when the panel is released above the snapping point for the standard position and below the snapping point for the expanded position (e.g., the vertical position associated with the standard position), the panel may snap to the expanded position if the velocity is above the first predetermined threshold. As another example, when a panel 434 is dragged from the expanded position and released above the snapping point for the standard position (e.g., 60 points below the expanded position), the panel may snap to the standard position if the velocity of the panel is above a first predetermined threshold (e.g., 5 points per second downward) and below a second predetermined threshold (e.g., 10 points per second downward) and may snap to the collapsed position if the velocity of the panel is above the second predetermined threshold. Similarly, when the panel is released below the standard position and above the snapping point for the expanded position (e.g., the vertical position associated with the standard position), the panel may snap to the panel may snap to the collapsed position if the velocity is above the first predetermined threshold.

User interfaces 400C-D illustrate panels 434 and 444 in the expanded position. Once the panel 434, 444 is in the expanded position, the content or information items displayed within panel 434, 444 can scroll. As illustrated in FIG. 4, some information items may be partially visible before scrolling (e.g., information item 440B in panel 424 and information item 440E in panel 434). Initially, a user interface may display a first subset of information items (e.g., information items 440A-E) that are visible prior to scrolling. For example, user interface 400C illustrates information items 440A-E with information item 440E being partially visible. The user interface may display a second subset of information items (e.g., information items 440B-G) that are not visible prior to scrolling, but are visible after scrolling. For example, user interface 400D illustrates additional information items (e.g., information items 440F-G) after a user interaction (e.g, directional scrolling) within panel 434, 444.

The user interfaces 400C-D also include maps 432, 436, which are mostly overlaid (e.g., almost completely, greater than 90% overlaid) by the panel 434, 444. For example, panel 434, 444 may be positioned 16 points away from the top of the display to partially display the map 432, 436. In such examples, the map 432, 436 may be all or partially dimmed when the panel is in the expanded position. In certain implementations, when the panel 434, 444 has been expanded, a user may tap on the map 432, 436 and the panel 434, 444 may be moved to a lower position (e.g., the standard and/or collapsed position). Additionally or alternatively, upon selecting an information item 440 displayed within the panel 434, 444 (e.g., a transportation proposal), the panel may be moved to a lower position (e.g., a lower position selected based on a modality associated with the transportation proposal).

User interactions, such as a drag interaction, may achieve different results depending on where the user starts the user interaction. For example, dragging up or down on the header (e.g., "Headline") of a panel 404, 424, 434 may move the entire panel up or down. If a panel 434, 444 is already in the expanded position and the user drags up, the panel 434, 444 may snap back to its current position upon release by the user. Similarly, if a panel 404 is already in the collapsed position and the user drags down, the panel 404 may snap back to its current position upon release. As another example, in the expanded position and, in certain implementations, in the standard position, dragging up on the scroll area 438 will scroll the information items 440A-G while leaving the header (e.g., "Headline") alone. In certain implementations, the header may have varying heights (e.g., may be smaller in height to make room for additional information items, may be larger in height to provide a larger area to grab). Additional user interactions may include one or more of tapping an panel expansion or panel collapse icon (e.g., an icon located at the top of the panel 434, 444, such as in an upper-right corner of the panel 434, 444). Further, prior to scrolling information items 440A-G in the scroll area 438, a user may be able to drag down anywhere within a panel 424, 434, 444 to collapse it to a smaller position. Similarly, if the panel 424 is in the standard position and a user scrolls up on displayed information items 440A-B, the panel 424 may be moved into the expanded position (e.g., the position of the panel 434).

In certain instances, panels may not be draggable to different positions and/or may not be scrollable to display additional information items. For example, panels in certain positions (e.g., collapsed and/or standard) may be generated to not be scrollable. Panels may also lock in (e.g., as non-draggable) depending on a status of a ride (e.g., after a user selects and/or accepts a transportation proposal, and/or when the panel is displaying guidance information to a user. In instances where the panel is not draggable, the appearance of the panel may differ. For example, the panel may not include an interaction indicator 305 and/or may have squared off corners (e.g., upper-left and upper-right corners) as compared to draggable panels 304, 324, 334, 344. For example, the corners of the panels 304, 324, 334, 344 may be rounded to indicate that the panels are draggable and to provide greater visibility of the map 402, 422, 432, 436. However, for non-draggable panels, the corners may be squared off to visually indicate to a user that the panel cannot be dragged to different positions.

Additionally or alternatively, panels may be partially scrollable so that scrolling is allowed in one direction but not in another. For example, a user may scroll a panel 444 to display additional information items 440E-G and may then reposition the panel 444 to the standard position. In such an instance, one or more of the additional information items 440E-G may be displayed within the panel. The user may be able to scroll up (e.g., to display earlier information items 440A-D), but may not be able to scroll down. Instead, if a user drags up on the panel, the panel may be returned to the expanded position according to the above-discussed snapping behaviors.

Figure 4B:
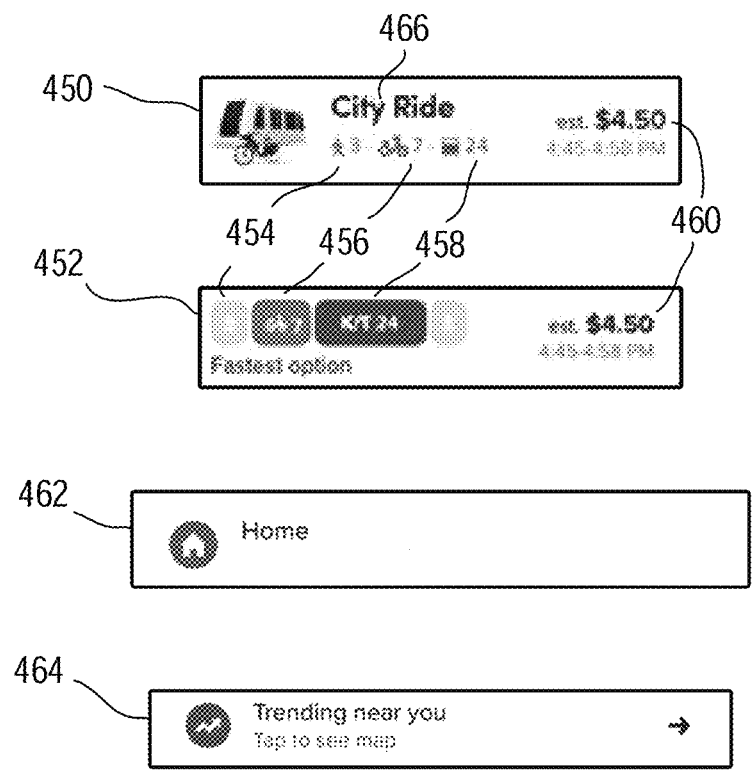
FIG. 4B illustrates information items according to exemplary embodiment of the present disclosure.

The panels 404, 424, 434, 444 may display one or more information items 440A-G. For example, FIG. 4B depicts information items 450, 452, 462, 464 according to exemplary embodiments of the present disclosure. The information items 450, 452, 462, 464 may be exemplary implementations of the information items 440A-G. In certain implementations, the information items 450, 452 may include transportation proposals that identify particular routes for transportation. For example, the information items 450, 452 may include a title 466 for the ride along with summary details. The summary details may include pictorials 454, 456, 458 of the modality or modalities used by the transportation proposal. The information items 450, 452 may additionally include a cost 460 of the ride. Transportation proposals and associated display techniques are discussed in greater detail in U.S. application Ser. No. 16/595, 394, titled "TRANSPORTATION ROUTE PLANNING AND GENERATION" and filed on Oct. 16, 2019, which is incorporated by reference herein. In certain implementations, the information items displayed in a panel may be ranked. More specifically, such rankings may account for user preferences regarding certain modalities (e.g., prefers bikes to scooters, does not like buses). Such preferences may involve a frequently-utilized modality, number of ride segments completed, ride service ratings, ride history, waiting time preferences/past practices, pick-up/drop-off location preferences, walking time, and the like. Additional information regarding ranking of transportation proposals and transportation options is provided in U.S. application Ser. No. 16/595,429, entitled "TRANSPORTATION PROPOSAL FILTRATION, COMPARISON, AND INCONVENIENCE MEASUREMENT" and filed on Oct. 16, 2019, which is herein incorporated by reference.

The displayed information items may also include predicted destinations. For example, the information item 462 includes the predicted destination of "home". In certain implementations, such information items may also include an address of the predicted destination and/or an estimated travel time to the predicted destination. In certain implementations, a user's destination may be predicted based on the time of day as compared to the times of previous transportation requests received from the user. For example, at certain times of day (e.g., morning or evening), a user may typically submit transportation requests for transportation to a particular destination (e.g., home or work). Therefore, at these times of day, the user may be predicted to travel to the destination that is typically requested. As a still further example, the information item 464 displays an option to view predicted destinations that are trending near a user (e.g., within a particular threshold distance of the user).

In certain implementations, information items 450, 452, 462, 464 may be selectable. When selected, an information item 450, 452, 462, 464 may expand to display additional information associated with the particular information item 450, 452, 462, 464, which may include complete train line names, transit stop identifiers, and/or may identify a type of automobile transportation received (e.g., shared transportation with other users and/or standard transportation not associated with other users requesting transportation). Selecting an information item 450, 452 associated with a transportation proposal may enable the user to purchase and begin following the transportation proposal. In other examples, information items may be selectable, e.g., to display more information, to enable selection of a transportation proposal, to enable a user to change one of the modalities for the transportation proposal. Additionally, selecting an information item 462, 464 associated with a predicted destination may enable the user to set the predicted destination as the destination for a transportation request.

The size of the information items 440A-G when displayed within the panel may be selected based on one or more of the contents of the information item, the position of the panel, and the number of information items. For example, as explained above, the information items 440A-G may expand or collapse as the panel 404, 424, 434 changes positions. As another example, if many information items 440A-G are identified for display, the information items 440A-G may be displayed with shorter heights than if comparatively fewer information items 440A-G are identified for display so that more information items 440A-G can fit within and be displayed by the panel. As a further example, particular types of information items (e.g., information items such as navigation guidance that display actionable information relevant to a user's behavior) may be displayed with larger heights in certain instances than other types of information items (e.g., further predicted destinations, alternative transportation proposals). Additionally or alternatively, in certain implementations, the information items 440A-G may be displayed with margins between one another and/or margins with the left and right sides of the screen to improve clarity and more clearly delineate between information items within the panels 404, 424, 434, 444. In certain implementations, the margins may differ depending on the height of the information items 440A-G. For example, taller information items 440A-G may result in smaller margins and shorter information items 440A-G may result in larger margins.

As illustrated in FIGS. 4A-4B, the user interfaces 400A-D may enable the efficient, concise, and contextually relevant display of information items 440A-G, 450, 452, 462, 464 within panels 404, 424, 434, 444 without unduly restricting the amount of visible information. For example, user interface 400C shows five different information items 440A-E, which may represent five different trip proposals. Including multiple pieces of information within panel 434 may allow a user to more quickly review and evaluate the information items (e.g., potential transportation options including transportation proposals) that utilize different types of transportation.

Additional information items, such as transportation proposals, may be viewable by scrolling down within panel 404, 424, 434, 444. For example, information item 440E is only partially visible in panel 434 and, by scrolling down, a user may uncover the remaining portion of information item 440E along with additional information items 440F-G as illustrated in panel 444. In an example, information items 440A-G may be transportation proposals, which may be organized according to specific criteria or user preferences. Additional information items (e.g., transportation proposals) may be viewable by scrolling down through the panel 434. As mentioned above, information items 440A-G may be arranged or organized according to a criteria or based on a ranking. For example, higher-ranked information items may be displayed above lower-ranked information items. For example, the information item 440A (e.g., transportation proposal) may be ranked higher than the information item 440B (e.g., transportation proposal) and may therefore be displayed above the information item 440B.

The user interfaces 400A-D may further include tab identifiers 406, 408, 410, 412 similar to tab identifiers 318, 320, 322 of FIG. 3. Based on a user interaction, such as selecting a tab identifier 406, 408, 410, 412, the panel 404, 424, 434, 444 may be moved to another position. Additionally, selection of tab identifiers 406, 408, 410, 412 may change the information items 440 that are displayed within the panel 404, 424, 434, 444. For example, referring back to FIG. 3, selecting the search tab identifier 318 may cause panel 304 to displays a search bar and information items 314, 316 such as a predicted destinations (e.g., "Home" and "Work") while selecting tab identifier 320 (e.g., the "bicycle icon") may cause panel 304 to display information items such as charge levels for nearby electrically-powered bicycles, transportation proposals that include personal mobility vehicles (e.g., scooters 306A-B and bikes 308A-B), and costs associated with utilizing nearby personal mobility vehicles. Similarly, selecting tab identifier 322 (e.g., the "train icon") may cause panel 304 to display information items such as a list of possible train lines and departure times and transportation proposals that include trains.

Some of the above-discussed embodiments of the user interfaces 300, 400A-D discuss sizes and/or positions of the panels 304, 404, 424, 434, 444 and information items 314, 316, 440A-G in points, which are defined above. It should be understood that any of the above-described embodiments that involve points of a display (e.g., points as defined by the iOS (ID operating system) may similarly be defined and/or controlled based on alternative measurements of the display. For example, pixel counts and/or distance measurements (e.g., in millimeters, centimeters, inches) may be utilized to define the sizes and/or positions in the above-discussed embodiments.

Figure 5A:
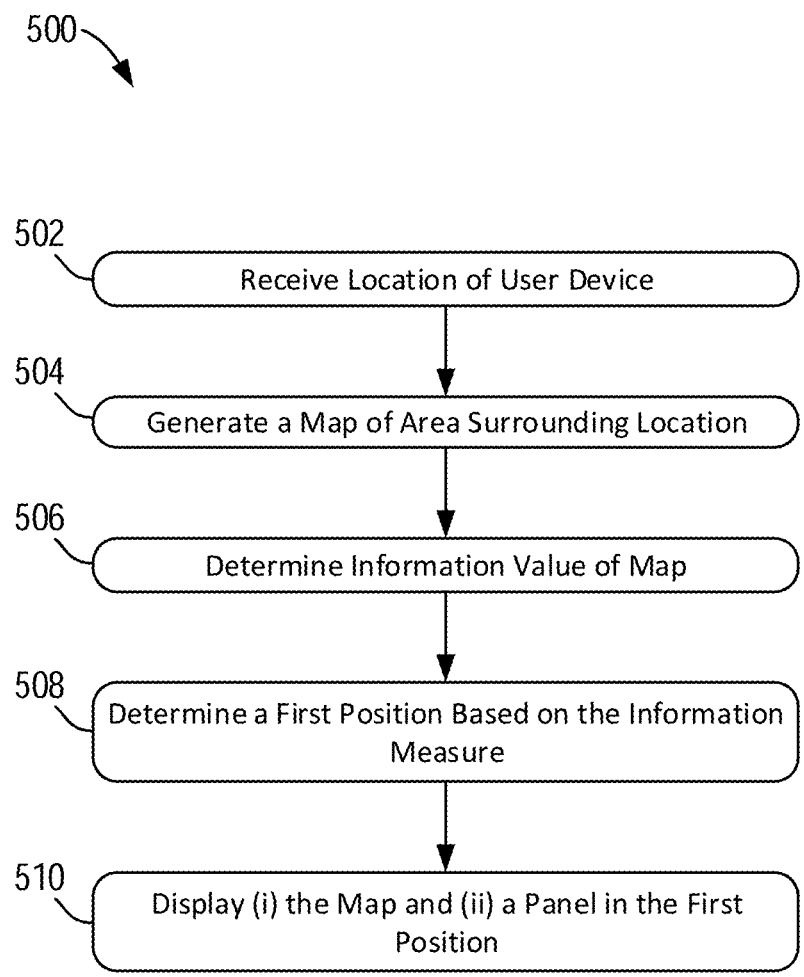
FIGS. 5A-5B illustrate methods for displaying a map and positioning a panel overlaying a portion of the map, according to an exemplary embodiment of the present disclosure.

FIG. 5A depicts an exemplary method 500 for displaying a map and determining a position of a panel overlaying at least a portion of the map on computing device or user device, such as a mobile device. The method 500 may be implemented on a computer system, such as computing device 200. For example, the method 500 may be implemented by computing device 200 to display a map and determine a position of a panel overlaying at least a portion of the map. The method 500 may also be implemented by a set of instructions stored on a computer readable medium that, when executed by a processor, cause the computer system or computing device to perform the method 500. For example, all or part of the method 500 may be implemented by the processor 218 and the memory 220. Although the examples below are described with reference to the flowchart illustrated in FIG. 5A, many other methods of performing the acts associated with FIG. 5A may be used. For example, the order of some of the blocks may be changed, certain blocks may be combined with other blocks, one or more of the blocks may be repeated, and some of the blocks described may be optional.

The method 500 begins with receiving a location of a user device (block 502). For example and with reference to FIG. 2, the user device, such as computing device 200 may receive a current location 312 of the device 200. Referring to FIG. 3, location 312 may be determined by using GPS, using multilateration of radio signals between cell towers and the user device, etc.

The user device may then generate a map of an area surrounding the location (block 504). For example, the user device may generate a map 200 that includes indicators of vehicles located in the area surrounding the location. The map 200 may include indicators of vehicles of different types (e.g., indicators of vehicles of a first type and vehicles of a second type).

An information value of the map may then be determined (block 506). For example, the user device may determine an information value 215 of the map 200. As explained further above, the information value 215 may be determined based on one or more of the number of vehicles displayed on the map 202, the type(s) of vehicles displayed on the map, a predicted destination of the user, and/or a quality of vehicles displayed on the map. In certain implementations, the information value 215 may be calculated at least in part based on the preferences of a user associated with the user device. For example, the types of criteria used to calculate the information measure 215 may be added or removed based on criteria associated with transportation requests that were received previously from the user. As another example, vehicles frequently or infrequently utilized by the user may, respectively, be used to determine which types of vehicles increase the information measure 215 and which types of vehicles decrease the information measure 215.

A first position may then be determined based on the information measure (block 508). For example, the user device may determine the first position 210 based on the information measure 215. The first position 210 may be determined from among multiple positions, including one or more of an expanded position, a standard position, a collapsed position, and a minimized position. In certain examples, and as explained further above, the information measure 215 may be compared to one or more thresholds to determine the first position 210. For example, if the information value 215 is below a first predetermined threshold, the first position 210 may be determined as the expanded position. As another example, if the medium information values 215 is above or equal to the first predetermined threshold and below a second threshold, the first position 210 may be determined as the standard position. As a further example, if the information values 215 is above or equal to the second predetermined threshold, the first position 210 may be determined as the collapsed or minimized position.

The map may then be displayed with the panel in the first position (block 510). For example, the user device may display the map 202 with the panel 208 overlaying the map 202 in the first position 210. In certain implementations, and as explained further above, the panel 208 may include information items, which may be scrollable depending on the position of the panel 208. In further implementations, the user device may detect user interactions that cause the panel 208 to change to a second position. For example, and as explained further above, the second position 208 may depending on a velocity of the user interaction.

Figure 5B:
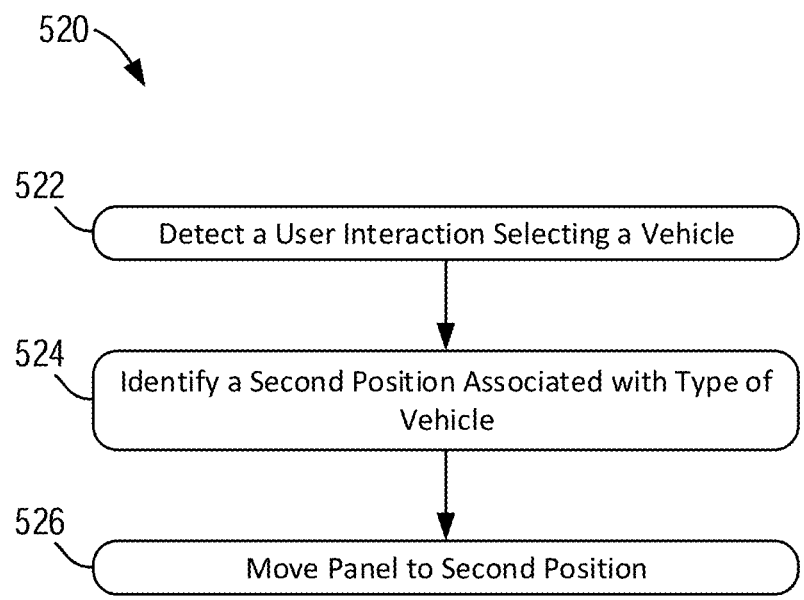

FIG. 5B depicts an exemplary method 520 for updating the position of a panel overlaying at least a portion of the map on computing device or user device, such as a mobile device. The method 520 may be implemented on a computer system, such as computing device 200. For example, the method 520 may be implemented by computing device 200 to display a map and determine a position of a panel overlaying at least a portion of the map. The method 520 may also be implemented by a set of instructions stored on a computer readable medium that, when executed by a processor, cause the computer system or computing device to perform the method 520. For example, all or part of the method 520 may be implemented by the processor 218 and the memory 220. Although the examples below are described with reference to the flowchart illustrated in FIG. 5B, many other methods of performing the acts associated with FIG. 5B may be used. For example, the order of some of the blocks may be changed, certain blocks may be combined with other blocks, one or more of the blocks may be repeated, and some of the blocks described may be optional.

The method 520 may begin with detecting a user interaction selecting a vehicle (block 522). As explained above, map 302 is adapted to display different types of vehicles associated with different transportation modalities. As illustrated in FIG. 3, map 302 displays road-going vehicles, such as cars 310A-C and personal mobility vehicles such as scooters 306A-B and bikes 308A-B. The user may interact with user interface 300 and select a vehicle on map 302 (e.g., selecting car 310A which is a road-going vehicle). Additionally or alternatively, the user interaction selecting the vehicle may include one or more of selecting a tab identifier associated with a particular type of vehicle, selecting an information item associated with a particular type of vehicle, and selecting a transportation proposal associated with a particular type of vehicle.

Based on the type of vehicle selected, a second position of the panel may be may be identified (block 524). The second position may be the same as the original or first position of panel 304 from block 504. In another example, the second position may be a different position than the original or first position of panel 304. In an illustrative example, as illustrated in FIG. 3, panel 304 may start in a standard position. Determining the second position based on the type of the vehicle may include determining the collapsed position as the second position when the selected vehicle is a bicycle (e.g., bike 308A) or a scooter (e.g., scooter 306B). In another example, the second position may be the same as the first position (e.g., the standard position) when the user interaction includes selecting an automobile (e.g., car 310A). Conversely, the second position may be an expanded position as the second position when the selected vehicle is a train. As discussed above, the expanded position provides additional space within panel 304 to display information items such as a list of train lines and departure times.

After identifying the second position, panel 304 may be moved to the second position (block 526). As mentioned above, panel 304 may be moved to the second position, which may depend on the type of vehicle or travel modality selected. The second position may be the collapsed position when the selected vehicle is a bicycle (e.g., bike 308A) or a scooter (e.g., scooter 306B). In another example, the second position may be the same as the first position (e.g., the standard position) when an automobile (e.g., car 310A) is selected. Conversely, the second position may be the expanded position when a train or public transit modality is selected.

Figure 6:
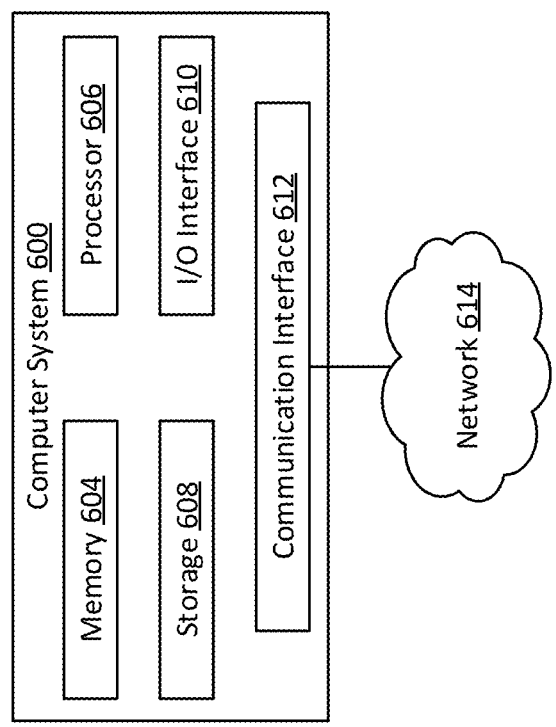
FIG. 6 illustrates a computer system according to an exemplary embodiment of the present disclosure.

FIG. 6 illustrates an example computer system 600 that may be utilized to implement one or more of the devices and/or components of FIG. 2, such as the computing device 200. In particular embodiments, one or more computer systems 600 perform one or more steps of one or more methods described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As an example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 610, and a communication interface 612. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 606. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MMUs) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation.

In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate. The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person (i.e., a user) and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 614 and any suitable communication interface 612 for the network 614. As an example and not by way of limitation, the network 614 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementations, this disclosure contemplates any suitable communication interface implementation.

The computer system 602 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Aspects of the present disclosure may be performed by entities and systems configured to provide transportation. For example, transportation providers may implement one or more of the above-described systems and methods. Transportation providers may include transportation networking companies (TNCs). TNCs may implement a transportation system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set quantity of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

Figure 7:
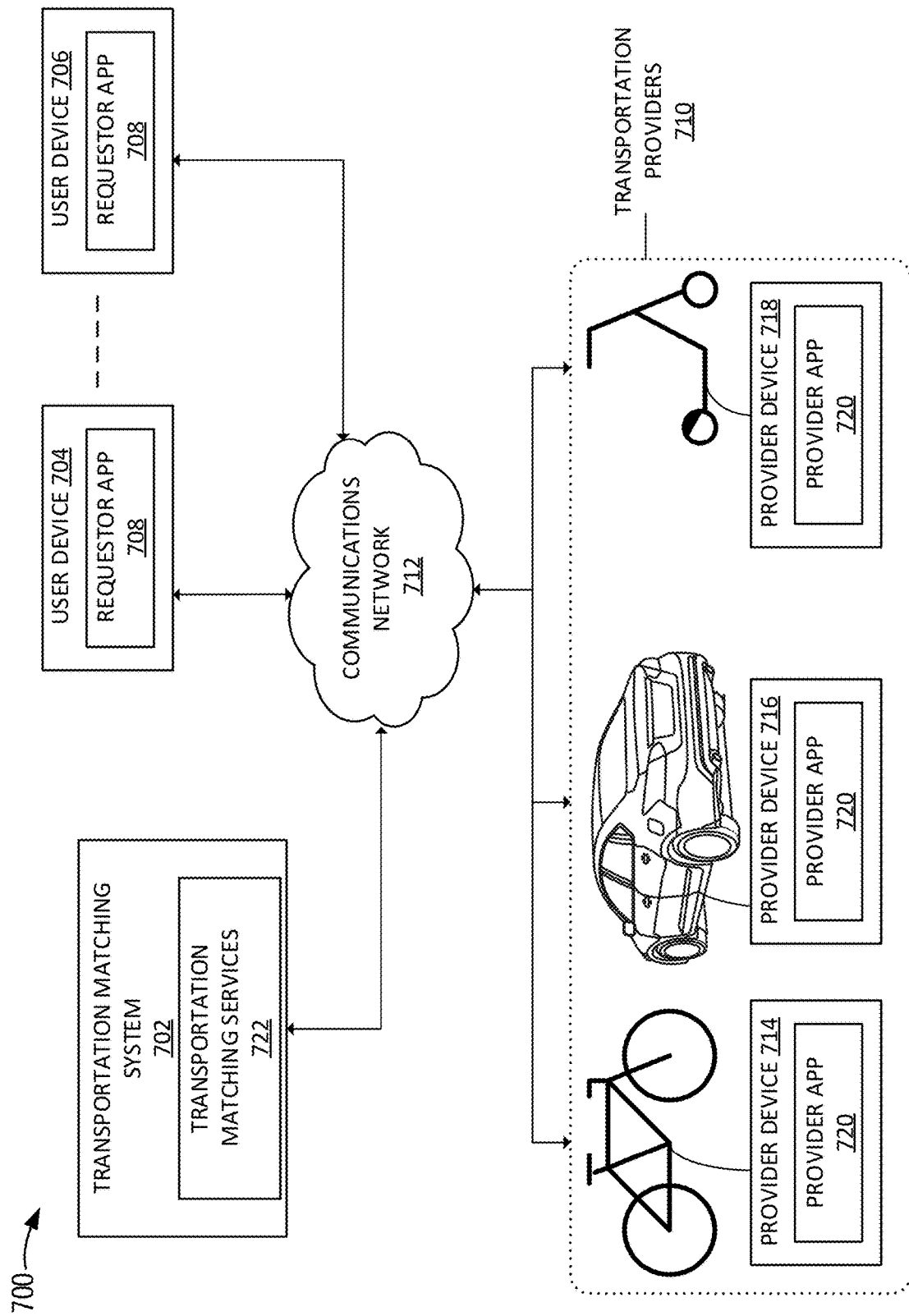
FIG. 7 illustrates a transportation matching system according to exemplary embodiments of the present disclosure.

FIG. 7 illustrates an example system 700 for matching transportation requests to a network of transportation vehicles according to one embodiment of the present disclosure. As illustrated, a transportation matching system 702 may communicate with user devices 704-706 requesting transportation. In some examples, the user devices 704-706 requesting transportation may include a requestor app 708 implemented by the transportation provider. The requestor app 708 may represent any application, program, and/or module that may provide one or more services related to requesting transportation services. For example, the requestor app 708 may include a transportation matching application for requestors. In some examples, the requestor app may match the user of the requestor app 708 (e.g., a transportation requestor) with transportation providers 710 through communication with the transportation matching system 702 via the communications network 712. In addition, the requestor app 708 may provide the transportation matching system 702 with information about a requestor (including, e.g., the current location of the requestor) to enable the transportation matching system 702 to provide dynamic transportation matching services for the requestor and one or more transportation providers 710, each of which may include a provider device 714, 716, 718. Each provider device may include a provider app 720, which may be any application program and/or set of instructions that may provide one or more services related to operating a vehicle and/or providing transportation matching services in conjunction with the transportation matching system 702 and the requestor app 708.

In some examples, the requestor app 708 may coordinate communications and/or a payment between a requestor and a transportation provider 710. According to some embodiments, the requestor app 708 may provide a map service, a navigation service, a traffic notification service, and/or a geolocation service. The provider app 720 may provide similar functions. In other implementations, the requestor app 708 may allow users to request access to certain vehicles, such as personal mobility vehicles (e.g., bicycles and/or scooters).

The transportation matching system 702 may arrange transportation on an on-demand and/or ad-hoc basis by, e.g., matching one or more transportation requestors with one or more transportation providers 710. For example, the transportation matching system 702 may provide one or more transportation matching services 722 for a networked transportation service, a ridesourcing service, a taxicab service, a car-booking service, an autonomous vehicle service, a personal mobility vehicle service, or some combination and/or derivative thereof. The transportation matching system 702 may include and/or interface with any of a variety of subsystems that may implement, support, and/or improve the transportation matching services 722. For example, the transportation matching services 722 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the reliability of a requestor and/or a provider), a payment system, and/or an autonomous or semi-autonomous driving system. The transportation matching system 702 may be implemented on various platforms, including a requestor-owned mobile device, a computing system installed in a vehicle, a server computer system, or any other hardware platform capable of providing transportation matching services to one or more requestors and/or providers.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   at least one processor; and
   a memory storing instructions which, when executed by the at least one processor, cause the system to:
   receive a geographic location of a mobile device;
   generate a map of an area surrounding the geographic location of the mobile device, the map displaying indicators of multiple vehicles of different vehicle types;
   determine a number of vehicles depicted within the map and a number of vehicle types depicted within the map;
   determine an information value by combining the number of vehicles depicted within the map and the number of vehicle types depicted within the map, wherein the information value dictates an overlaying position for a panel within a graphical user interface;
   determine, based on the information value, a first overlaying position indicating a size and a location for the panel relative to the map within the graphical user interface on the mobile device; and
   provide the map and the panel for display together within the graphical user interface on the mobile device according to the first overlaying position.

2. The system of claim 1, further comprising instructions that, when executed by the at least one processor, cause the system to determine the first overlaying position by selecting the first overlaying position from among a set of possible overlaying positions comprising a standard position overlaying less than half of the map, a collapsed position overlaying a smaller portion of the map than the standard position, and an expanded position overlaying a majority of the map.

3. The system of claim 2, further comprising instructions that, when executed by the at least one processor, cause the system to determine the first overlaying position by at least one of:
   (i) selecting the expanded position as the first overlaying position based on determining that the information value is less than a first predetermined threshold,
   (ii) selecting the standard position as the first overlaying position based on determining that the information value is greater than the first predetermined threshold and less than a second predetermined threshold, or
   (iii) selecting the collapsed position as the first overlaying position based on determining that the information value is greater than the second predetermined threshold.

4. The system of claim 1, further comprising instructions that, when executed by the at least one processor, cause the system to determine the information value by further determining at least one of (i) a number of vehicles currently located within a threshold distance of the geographic location of the mobile device, (ii) a previous type of vehicle used by a user associated with the mobile device, or (iii) a predicted destination of the user associated with the mobile device.

5. The system of claim 1, further comprising instructions that, when executed by the at least one processor, cause the system to:
   detect a user interaction moving the panel with a velocity;
   identify, based on the first overlaying position and the velocity, a second overlaying position indicating a second size and a second location for the panel relative to the map within the graphical user interface on the mobile device; and
   adjust the panel displayed within the graphical user interface according to the second overlaying position.

6. The system of claim 1, further comprising instructions that, when executed by the at least one processor, cause the system to:
   determine that the map displays indicators for a first vehicle of a first type and a second vehicle of a second type;
   detect a user interaction selecting the first vehicle;
   identify, based on the first type of the first vehicle, a second overlaying position indicating a second size and a second location for the panel relative to the map within a graphical user interface on the mobile device; and
   adjust the panel displayed within the graphical user interface according to the second overlaying position.

7. The system of claim 1, further comprising instructions that, when executed by the at least one processor, cause the system to:
   provide tab identifiers for display overlaying a bottom portion of the map;
   detect a user interaction selecting a tab identifier of the tab identifiers; and
   adjust the panel displayed within the graphical user interface according to a third overlaying position based on the tab identifier, wherein the third overlaying position indicates a third size and a third location for the panel.

8. A method comprising:
   receiving a geographic location of a mobile device;
   generating a map of an area surrounding the geographic location of the mobile device, the map displaying indicators of multiple vehicles of different vehicle types;
   determining a number of vehicles depicted within the map and a number of vehicle types depicted within the map;
   determining an information value by combining the number of vehicles depicted within the map and the number of vehicle types depicted within the map, wherein the information value dictates an overlaying position for a panel within a graphical user interface;
   determining, based on the information value, a first overlaying position indicating a size and a location for the panel relative to the map within the graphical user interface on the mobile device; and
   providing the map and the panel for display together within the graphical user interface on the mobile device according to the first overlaying position.

9. The method of claim 8, wherein determining the first overlaying position comprises selecting the first overlaying position from among a set of possible overlaying positions comprising a standard position overlaying less than half of the map, a collapsed position overlaying a smaller portion of the map than the standard position, and an expanded position overlaying a majority of the map.

10. The method of claim 9, wherein determining the first overlaying position further comprises at least one of:
  (i) determining that the information value is less than a first predetermined threshold and selecting the expanded position as the first overlaying position based on determining that the information value is less than the first predetermined threshold,
  (ii) determining that the information value is greater than the first predetermined threshold and less than a second predetermined threshold and selecting the standard position as the first overlaying position based on determining that the information value is greater than the first predetermined threshold and less than the second predetermined threshold, or
  (iii) determining that the information value is greater than the second predetermined threshold and selecting the collapsed position as the first overlaying position based on determining that the information value is greater than the second predetermined threshold.

11. The method of claim 8, wherein determining the information value comprises determining at least one of (i) a number of vehicles currently located within a threshold distance of the geographic location of the mobile device, (ii) a previous type of vehicle used by a user associated with the mobile device, or (iii) a predicted destination of the user associated with the mobile device.

12. The method of claim 8, further comprising:
  detecting a user interaction moving the panel with a velocity;
  identifying, based on the first overlaying position and the velocity, a second overlaying position indicating a second size and a second location for the panel relative to the map within the graphical user interface on the mobile device; and
  adjusting the panel displayed within the graphical user interface according to the second overlaying position.

13. The method of claim 8, further comprising:
  determining that the map displays indicators for a first vehicle of a first type and a second vehicle of a second type;
  detecting a user interaction selecting the first vehicle;
  identifying, based on the first type of the first vehicle, a second overlaying position indicating a second size and a second location for the panel relative to the map within a graphical user interface on the mobile device; and
  adjusting the panel displayed within the graphical user interface according to the second overlaying position.

14. The method of claim 8, further comprising:
  providing tab identifiers for display overlaying a bottom portion of the map;
  detecting a user interaction selecting a tab identifier of the tab identifiers; and
  adjusting the panel displayed within the graphical user interface according to a third overlaying position based on the tab identifier, wherein the third overlaying position indicates a third size and a third location for the panel.

15. A non-transitory, computer-readable medium storing instructions which, when executed by at least one processor, cause a computing device to:
  receive a geographic location of a mobile device;
  generate a map of an area surrounding the geographic location of the mobile device, the map displaying indicators of multiple vehicles of different vehicle types;
  determine a number of vehicle types depicted within map;
  determine an information value based on the number of vehicle types depicted within the map, wherein the information value dictates an overlaying position for a panel within a graphical user interface;
  determine, based on the information value, a first overlaying position indicating a size and a location for the panel relative to the map within the graphical user interface on the mobile device; and
  provide the map and the panel for display together within the graphical user interface on the mobile device according to the first overlaying position.

16. The non-transitory, computer-readable medium of claim 15, further comprising instructions that, when executed by the at least one processor, cause the computing device to determine the first overlaying position by selecting the first overlaying position from among a set of possible overlaying positions comprising a standard position overlaying less than half of the map, a collapsed position overlaying a smaller portion of the map than the standard position, and an expanded position overlaying a majority of the map.

17. The non-transitory, computer-readable medium of claim 16, further comprising instructions that, when executed by the at least one processor, cause the computing device to determine the first overlaying position by at least one of:
  (i) determining that the information value is less than a first predetermined threshold and selecting the expanded position as the first overlaying position based on determining that the information value is less than the first predetermined threshold,
  (ii) determining that the information value is greater than the first predetermined threshold and less than a second predetermined threshold and selecting the standard position as the first overlaying position based on determining that the information value is greater than the first predetermined threshold and less than the second predetermined threshold, and
  (iii) determining that the information value is greater than the second predetermined threshold and selecting the collapsed position as the first overlaying position based on determining that the information value is greater than the second predetermined threshold.

18. The non-transitory, computer-readable medium of claim 15, further comprising instructions that, when executed by the at least one processor, cause the computing device to determine the information value by further determining at least one of (i) a number of vehicles currently located within a threshold distance of the geographic location of the mobile device, (ii) a previous type of vehicle used by a user associated with the mobile device, or (iii) a predicted destination of the user associated with the mobile device.

19. The non-transitory, computer-readable medium of claim 15, further comprising instructions that, when executed by the at least one processor, cause the computing device to:
  detect a user interaction moving the panel with a velocity;
  identify, based on the first overlaying position and the velocity, a second overlaying position indicating a second size and a second location for the panel relative to the map within the graphical user interface on the mobile device; and
  adjust the panel displayed within the graphical user interface according to the second overlaying position.

20. The non-transitory, computer-readable medium of claim 15, further comprising instructions that, when executed by the at least one processor, cause the computing device to:
- determine that the map displays indicators for a first vehicle of a first type and a second vehicle of a second type;
- detect a user interaction selecting the first vehicle;
- identify, based on the first type of the first vehicle, a second overlaying position indicating a second size and a second location for the panel relative to the map within a graphical user interface on the mobile device; and
- adjust the panel displayed within the graphical user interface according to the second overlaying position.

* * * * *

UNITED STATES PATENT AND TRADEMARK OFFICE
CERTIFICATE OF CORRECTION

PATENT NO. : 11,681,420 B2  
APPLICATION NO. : 16/714316  
DATED : June 20, 2023  
INVENTOR(S) : Anna Pan et al.

Page 1 of 1

It is certified that error appears in the above-identified patent and that said Letters Patent is hereby corrected as shown below:

On the Title Page

In item (72), in the inventor section, after Bradley Ellis, San Francisco, CA (US); please correct the inventor spelling as follows:
Jaden Junghyun Choi, Temecula, CA (US)

Signed and Sealed this
Twenty-eighth Day of January, 2025

Coke Morgan Stewart
*Acting Director of the United States Patent and Trademark Office*